Patented June 30, 1942

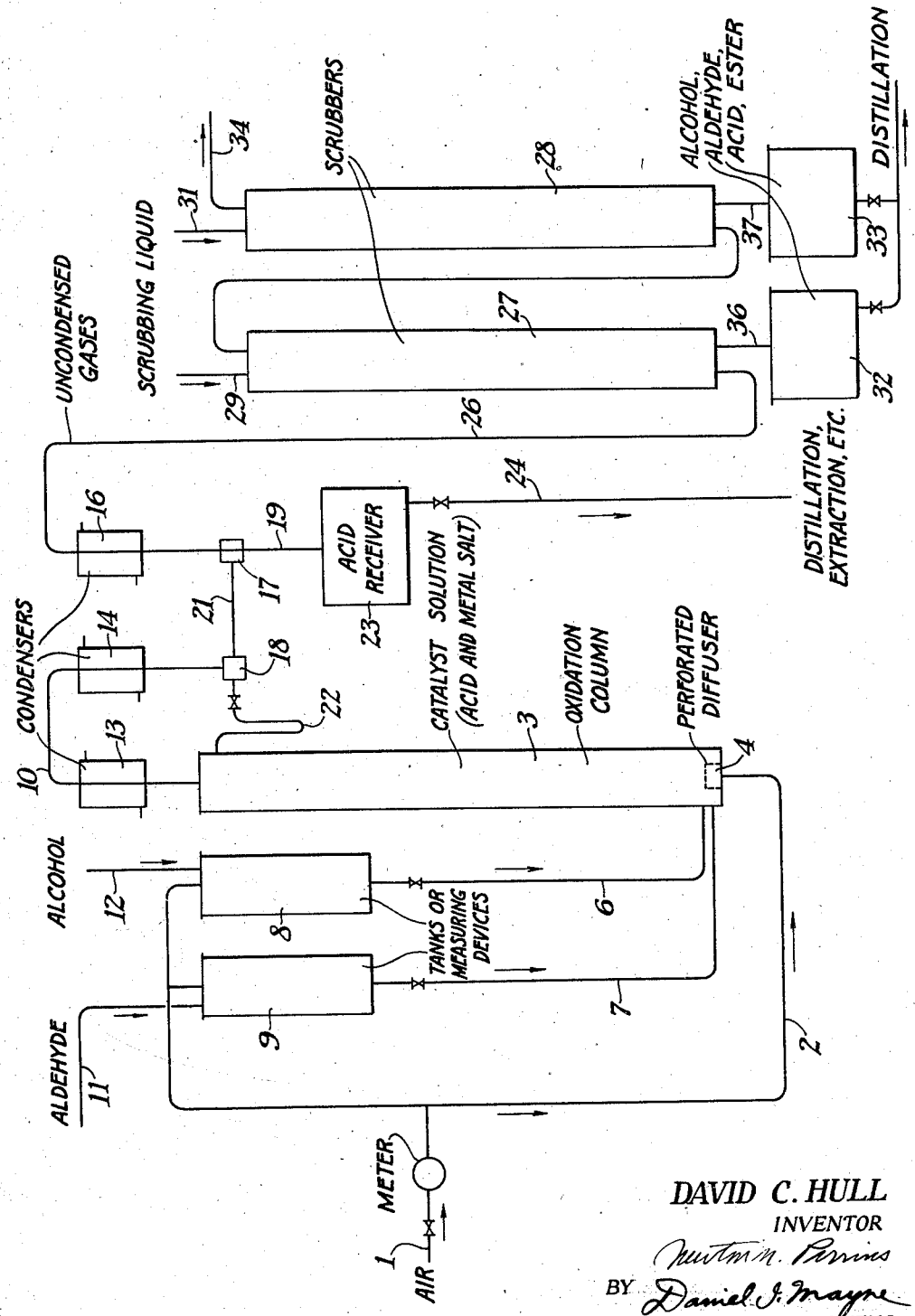

2,287,803

UNITED STATES PATENT OFFICE 2,287,803

DIRECT CONVERSION OF ALCOHOLS TO ACIDS

David C. Hull, Kingsport, Tenn., assignor to Eastman Kodak Company, Rochester, N. Y., a corporation of New Jersey Application September 7, 1938, Serial No. 228,822

6 Claims. (Cl. 260—531)

This invention relates to the direct low temperature manufacture of acids and other products from alcohols and more particularly to the direct oxidation treatment of aliphatic alcohols to obtain aliphatic acids therefrom.

Organic acids are well-known and have many industrial uses. For example, the acids such as acetic acid, propionic acid and butyric acid are utilized extensively in the manufacture of cellulose esters. It has been proposed to convert alcohols to acids by the vapor phase catalytic treatment of the alcohols at temperatures greater than 150°–200° C. and usually at temperatures in excess of 300° C. It has also been proposed to oxidize alcohols in aqueous solutions of chromates and other such oxidizing salts which may be regenerated electrolytically. However, these methods involve various complications. At present one procedure for treating alcohols comprises converting the alcohol to aldehyde and thereafter oxidizing the aldehyde to acid. However, this process is not direct; hence, requires considerable equipment and otherwise is not as satisfactory as my novel procedure to be described herein.

I have found a simple, economical and efficient method adapted for either small or large scale operation, whereby various alcohols (primary or secondary) may be directly oxidized at relatively low temperatures and with large yields. I have found that, for example, the various aliphatic alcohols may be converted directly to acids or if desired, acids in admixture with various organic esters. The secondary alcohols may be converted to other type oxidation products by similar procedure.

This invention has for one object to provide a process for the conversion of alcohols to acids. Another object is to provide an oxidation process which may be applied to either mono- or polyhydroxy alcohols. Still another object is to provide an oxidation process for treating alcohols which may be operated at relatively low temperatures and under ordinary pressure conditions. Still another object is to provide a process for oxidizing alcohols which can, if desired, be operated at either superatmospheric or reduced pressures. A still further object is to provide a process particularly adapted for the direct conversion of lower aliphatic alcohols to lower aliphatic acids.

A still further object is to provide a process for the manufacture of mixtures of acids from alcohols. A still further object is to provide a process wherein an aliphatic acid may be produced together with a content of the ester of said acid. Still another object is to provide an oxidation process which may be applied to alcohols in the presence of aldehydes. A still further object is to provide an oxidation process which is simple and effective and may be applied to a variety of alcohols and aldehydes.

Still another object is to provide a process particularly adapted for the direct conversion of ethyl alcohol or ethyl alcohol and acetaldehyde to acetic acid alone or in the presence of an acetate. Another object is to provide an oxidation procedure which may be applied to the conversion of acetaldehyde together with an alcohol containing more than two carbon atoms or an alcohol containing more than two carbon atoms in the presence of the same or a different aldehyde. Still another object is to provide a simple and effective procedure for the oxidation of polyhydroxy alcohols. Another object is to provide a method for converting an alcohol in the presence of an aldehyde, to mixtures of acids with esters.

A still further object is to provide a novel catalyst containing liquid particularly adapted for the conversion of alcohols in the presence of aldehydes directly to acids and esters. Still another object is to provide a method for activating and utilizing said catalyst.

A still further object is to provide an apparatus particularly suitable for the direct conversion of alcohols in the presence of aldehydes to aliphatic acids, and, if desired, esters. Other objects will appear hereinafter.

I have found that if an alcohol, preferably in the presence of a content of aldehyde, is fed into the proper type catalyst solution, the alcohol and any aldehyde may be oxidized directly to acid even though the catalyst is in the liquid condition and at relatively low temperatures. The corresponding aldehyde may be fed in with an alcohol to give the same acid, or different aldehydes and alcohols may be used to obtain mixed acids. The acids may be removed from the catalyst solution continuously as by distillation, for example.

For a further understanding of my invention, reference is made to the attached drawing. The drawing is in the nature of a diagrammatic side elevation view showing a flow sheet of one apparatus setup which could be employed for carrying out my invention.

Referring to the drawing, 1 is the source of oxidizing medium, such as air, ozone, oxygen or the like. The gas is fed through conduit 2 to the oxidation column 3. This column may comprise any of several different constructions; for example, sieve plate column, bubble cap column, or the like. However, I prefer to employ a column more or less the same as the columns described in Hasche application Serial No. 100,144, now Patent No. 2,159,988. A temperature controlling jacket, cooling coils or other means for regulating the temperature of column 3 (not shown) may be provided. A suitable diffuser means, as for example, the perforated thimble 4, may be positioned in the column for dispersing the constituent fed in through conduit 2.

The column is also provided with a plurality of inlets 6 and 7 for alcohol and aldehyde. These components are supplied through tanks, metering devices or other such equipment designated 8 and 9. The alcohol and aldehyde are supplied from conduits 11 and 12, connected with suitable sources thereof, as will be discussed hereinafter.

Column 3 is connected by means of conduit 10 with a plurality of dephlegmators and condensers designated 13, 14 and 16. These devices may be supplied with cooling water, brine or other cooling medium, depending on the acid or ester being produced, its boiling point, and other such factors. One or more of these cooling devices may be interconnected through weir boxes such as 17 and 18 and conduits 19, 21 and 22, with the column and with acid receiver 23.

Receiver 23 may be used to collect the acid produced, the ester or certain other constituents obtained from the process. These constituents may be drawn off through valved conduit 24 to distillation, extraction, pyrolysis, esterification or other treatment which it may be desired to apply thereto.

Conduit 26 is provided for conducting the uncondensed constituents to scrubbers 27 and 28. These scrubbers may be of more or less conventional construction. A suitable scrubbing liquid, as water, alcohol or the like, would be introduced through conduits 29 and 31 and withdrawn through conduits 36 and 37 to the receivers positioned therebelow. The waste gas, usually nitrogen, if air has been used, together with some carbon dioxide and methane, escapes through conduit 34. The materials collected in receivers 32 and 33 may be withdrawn to distillation or other treatment.

It is, of course, to be understood that suitable flow meters, thermometers, valves and other such devices would be employed in the setup for aiding in the functioning of the apparatus or rendering it automatic or semi-automatic. The parts exposed to contact with corrosive constituents would be constructed of stainless steels, tile or other materials capable of withstanding any corrosion encountered. The parts subject to heating would be constructed of suitable heat resisting materials.

The functioning of my apparatus, as well as an understanding of my novel process, will be more apparent from the following examples. It is to be understood that these examples are set forth primarily for the purpose of illustrating my preferred embodiment and they are not to be considered as a limitation upon my invention.

*Example I.*—Referring to the drawing, a run for producing acetic acid from ethyl alcohol will be described. Oxidation unit 3 was charged with a solution of cobalt acetate $(CO(C_2HO_3)_2.4H_2O)$ in glacial acetic acid. While in this example approximately an 8% solution was employed, other proportions and other catalyst salts could be used. In general, however, the catalyst solution will be comprised at least 50% or 60% of acid and in many instances 75% or more of acid. Air was blown in through conduit 1 and conducted through conduit 2 into the oxidation column 3, passing through the perforated thimble 4. At the same time acetaldehyde was fed through the measuring device 9 into column 3 through conduit 7. This was continued until the catalyst solution turned from a pinkish color to a more or less dark green and the temperature of the unit was regulated to about between 60°–70° C. This temperature was maintained by circulation of cooling mediums in a cooling jacket surrounding the oxidation chamber.

Thereafter the ethyl alcohol to be oxidized was supplied to the unit through measuring device 8 and conduit 6. The supply of aldehyde and air through conduits 2 and 7 were continued. Acetic acid was formed from the ethyl alcohol and distilled off through reflux condenser 13, and coolers 14 and 16 to acid receiver 23. The excess oxygen and nitrogen together with some non-condensible gases and small quantities of aldehyde, alcohol and acid, were conducted through conduit 26 to the scrubbers 27 and 28, where substantially all useful products were recovered by scrubbing. The gases were then discharged through conduit 34 to the atmosphere.

In this example the usual water azeotrope of ethyl alcohol was employed. However, it is possible to employ a more dilute alcohol, or if desired, an anhydrous alcohol may be supplied. The reaction was conducted in the liquid phase and at normal atmospheric pressure. However, superatmospheric pressure may be used.

*Example II.*—In this example an apparatus arrangement similar to that of Example I was also employed. Approximately a total of 252 grams of aldehyde was fed into the catalyst initially for inducing a color change and for producing acid. During this oxidation an addition of 85.4 grams of 100% ethyl alcohol was fed. The resultant product indicated that 2.3% of the alcohol fed had been converted to ethyl acetate, 3½% unchanged and 94.2% converted to acid. A very small amount of non-condensible product such as carbon dioxide and methane were formed.

*Example III.*—In accordance with this example, 470 grams of acetaldehyde were fed and 413.7 grams of 100% normal butyl alcohol added. 76.4% of the butyl alcohol was converted to butyric acid, 2.4% to butyl acetate and 1.03% to butyl butyrate. Approximately .26% remained unchanged. In this example, apparatus, catalyst and procedure similar to that described in detail with respect to Example I was employed.

*Example IV.*—In this run approximately pure oxygen, rather than air, was used as the oxidizing medium. The catalyst was initially treated with acetaldehyde as already described. Then a mixture of 95% normal butyl alcohol and 5% acetaldehyde (weight percentage) were fed in. Likewise, in this example the alcohol was oxidized to butyric acid.

While in the preceding examples cobalt acetate was used as a catalyst, inasmuch as this catalyst was available and found to give particularly good results, other metal salts may be employed. For example, mixtures of nickel and cobalt acetate were satisfactory. Nickel acetate alone, functioned as a catalyst. Cobalt and copper acetate in admixture or copper acetate alone, may be employed. In general, I have found for my novel oxidation procedure that the various heavy metals numbered from 25-29, periodic system, function satisfactorily in aliphatic acid solution. Preferably, the organic salt of these metals, the salt being soluble in aliphatic acids, such as propionic and butyric acids, would be employed.

As indicated, other oxidizing medium besides air, such as relatively pure oxygen, may be used. When pure oxygen is used, the catalyst is quite active and the alcohol may be fed more or less independent of the aldehyde supply. That is, a small amount of aldehyde may be approximately simultaneously introduced with the alcohol or the aldehyde may be introduced at intervals. However, in my preferred processes, I carry out the alcohol treatment in the presence of at least a few percent of aldehyde.

I have also found that various aldehydes may be introduced. For example, acetaldehyde in combination with ethyl alcohol or butyl alcohol function satisfactorily. Or, if desired, butyraldehyde or some other aldehyde in conjunction with the same or a different alcohol could be employed.

While for treating constituents such as ethyl alcohol, acetaldehyde, etc., temperatures between 50°-60° to 80° C. are preferred, other temperatures may be employed, depending on the particular acids or esters being produced exemplified by temperatures below 145° C. In general, however, I prefer to maintain the temperature of my catalyst solution below the boiling point of the acid being produced. That is, if acetic acid is being produced, the temperature of the catalyst solution would be maintained at, for example, 70° or 80° C. If acids or esters of the higher acids such as propionic or butyric acid were being produced, higher temperatures may be employed. For example temperatures as high as 145° C. may be used in many instances. However, in general a temperature would not be employed, under normal pressure conditions, greater than the boiling point of the acid being produced. Also, higher or lower temperatures may be employed, depending on whether superatmospheric or reduced pressure were applied to the process. In most instances catalyst concentration of 3% or 4% to 12-15% in an aliphatic acid such as acetic acid functions satisfactorily. However, these limits may be varied somewhat.

I have found that my process may be varied somewhat to produce results different from those described in the preceding examples.

*Example V.*—In accordance with the procedure of this example, the process was carried out similar to that set forth in detail with respect to Examples I, II, III and IV. However, in all instances, the quantities of alcohol fed were increased substantially over those specified and over that which the oxidation column was capable of oxidizing. In other words, a substantial excess of alcohol was supplied in each instance. By this procedure a mixture of aliphatic acid and ester was obtained, the quantity of ester being as high as one-fourth to one-half of the alcohol supplied.

*Example VI.*—In accordance with another embodiment of my invention, the ester produced in the process was separated and fed through a dehydrogenation system operating at between about 350°-600° C. The ester yielded aldehyde and acid. The aldehyde was employed as the aldehyde fed in runs similar to those described in Examples I-IV, inclusive. In another instance a portion of the alcohol was supplied through this system containing a dehydrogenation catalyst (copper), operating at 300°-600° C. to convert the alcohol to aldehyde. This aldehyde was supplied through conduit 11. The other portion of the alcohol was supplied through conduit 12 and the process conducted to oxidize the alcohol in the presence of aldehyde, as already described.

*Example VII.*—In this example the catalyst solution, the alcohol and aldehydes employed were the same as described in the preceding examples, as for instance, Examples II and III. The alcohol and aldehyde were fed to the apparatus in a manner as already described. However, in this instance the ester formed in the preceding steps was circulated to the oxidation along with the feed. The ester alone or the ester together with a content of water may be so circulated. That is, the ethyl acetate formed by the process of Example II was fed along with the new alcohol and aldehyde going to the apparatus. If desired, a content of water may be supplied along with the ester. I have found that by this procedure further ester formation may be minimized. I have found that by recycling the ester further ester formation may be deterred and the reaction caused to go in the desired direction, namely, the oxidation of the alcohol to acid. I have also found that merely adding water depresses ester formation.

As indicated, in the previous description, I prefer to carry out my alcohol oxidation in the presence of some aldehyde. I have found that aldehyde appears to assist in keeping the catalyst in the highest state of efficiency. The quantity of aldehyde used may be varied, depending on the character of the oxidizing medium, the alcohol being treated and other such factors. Usually 5-50% is employed. However, I generically described the quantity of aldehyde as that which is sufficient under the conditions of oxidation to keep the catalyst in an active state.

While my process is particularly adapted to the treatment of aliphatic mono-hydric alcohols for the production of aliphatic acids therefrom, my invention has wider applications. For example, my process may be applied to the formation of oxidation products of polyhydroxy alcohols such as the glycols and glycerine. The process also may be employed to oxidation of secondary alcohols with the resultant production of ketones, for example.

From the preceding examples, it may be seen that I have provided a novel, simple and efficient method for the direct oxidation of hydroxy compounds. My process is economical and satisfactory for industrial operation, inasmuch as it readily functions at low temperatures and normal atmospheric pressure, giving high yields substantially greater than 90% in many instances. The process is flexible of operation and may be employed not only for the production of acids alone, but may be utilized to produce mixtures of acids such as mixtures of acetic and butyric acids. Or, the acids may be produced in the presence of esters. Either concentrated or diluted alcohols and aldehydes may be employed in my process. For example, the ordinary commercial azeotrope comprising 95% ethyl alcohol and 5% water, functions satisfactorily in my process.

It is therefore apparent from the preceding, that my invention is susceptible of some modification; hence, I do not wish to be restricted therein, excepting insofar as is necessitated by the prior art and the spirit of the appended claims.

Having now particularly described my invention, what I desire to secure by Letters Patent of the United States and what I claim is:

1. A process for the direct oxidation of a lower aliphatic alcohol for producing the corresponding aliphatic acid, which comprises treating a solution of a cobalt salt in an aliphatic acid with an aldehyde and a gaseous oxidizing medium to form a catalyst solution, introducing material amounts of a lower aliphatic alcohol and additional aldehyde into said catalyst solution, oxidizing the alcohol of the resulting solution of catalyst, alcohol and aldehyde by treating said solution with a gaseous oxidizing medium, maintaining the temperature of the solution of catalyst, alcohol and aldehyde during its treatment with the gaseous oxidizing medium such that the solution is maintained in the liquid phase, and subsequently recovering the aliphatic acid produced.

2. A process for the direct oxidation of a lower aliphatic alcohol for producing the corresponding aliphatic acid, which comprises treating a solution of a metal ion of a metal numbered 25 to 29 inclusive of the periodic table in an aliphatic acid with an aldehyde and a gaseous oxidizing medium to form a catalyst solution, introducing material amounts of a lower aliphatic alcohol and additional aldehyde into said catalyst solution, oxidizing the alcohol of the resulting solution of catalyst, alcohol and aldehyde by treating said solution with a gaseous oxidizing medium, maintaining the temperature of the of the solution of catalyst, alcohol and aldehyde during its treatment with the gaseous oxidizing medium such that the solution is maintained in the liquid phase below 145° C.

3. A process for the direct oxidation of butyl alcohol for producing butyric acid which comprises treating a solution of a metal ion of a metal numbered 25 to 29 inclusive of the periodic table in an aliphatic acid with an aldehyde and a gaseous oxidizing medium to form a catalyst solution, introducing material amounts of butyl alcohol and acetaldehyde into said catalyst solution, oxidizing the butyl alcohol of the resulting solution of catalyst, alcohol and aldehyde by treating said solution with a gaseous oxidizing medium, and maintaining the temperature of the solution of catalyst, butyl alcohol and aldehyde during its treatment with the gaseous oxidizing medium such that the solution is maintained in the liquid phase.

4. A process for the direct oxidation of lower aliphatic alcohols to obtain the corresponding acids, which comprises preparing a solution of a metal ion of a metal numbered 25 to 29 inclusive of the periodic table in an aliphatic acid as a catalyst solution, introducing material amounts of a lower aliphatic alcohol and lower aliphatic aldehyde into said catalyst solution, oxidizing the alcohol of the resulting solution of catalyst, alcohol and aldehyde by treating said solution with a gaseous oxidizing medium, and maintaining the temperature of the solution of catalyst, alcohol and aldehyde during its treatment with the gaseous oxidizing medium such that the solution is maintained in the liquid phase.

5. A process for the direct oxidation of lower polyhydroxy aliphatic alcohols to obtain the corresponding acids, which comprises preparing a solution of a metal ion of a metal numbered 25 to 29 inclusive of the periodic table in an aliphatic acid as a catalyst solution, introducing material amounts of said lower aliphatic alcohol and a lower aliphatic aldehyde into said catalyst solution, oxidizing the alcohol of the resulting solution of catalyst, alcohol and aldehyde by treating said solution with a gaseous oxidizing medium, and maintaining the temperature of the solution of catalyst, alcohol and aldehyde during its treatment with the gaseous oxidizing medium such that the solution is maintained in the liquid phase.

6. A process for the direct oxidation of a lower aliphatic alcohol to obtain the corresponding acid which comprises preparing a solution of a metal ion of a metal numbered 25 to 29 inclusive of the periodic table in an aliphatic acid as a catalyst solution, introducing material amounts of a lower aliphatic alcohol and lower aliphatic aldehyde into said catalyst solution said alcohol being in substantial excess, oxidizing the alcohol of the resulting solution of catalyst, alcohol and aldehyde by treating said solution with a gaseous oxidizing medium, and maintaining the temperature of the solution of catalyst, alcohol and aldehyde during its treatment with the gaseous oxidizing medium such that the solution is maintained in the liquid phase.

DAVID C. HULL.